June 6, 1933.  H. L. PROUT  1,912,917
VARIABLE SPEED TRANSMISSION
Filed Dec. 3, 1932   2 Sheets-Sheet 1
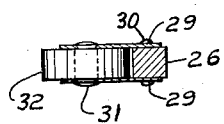
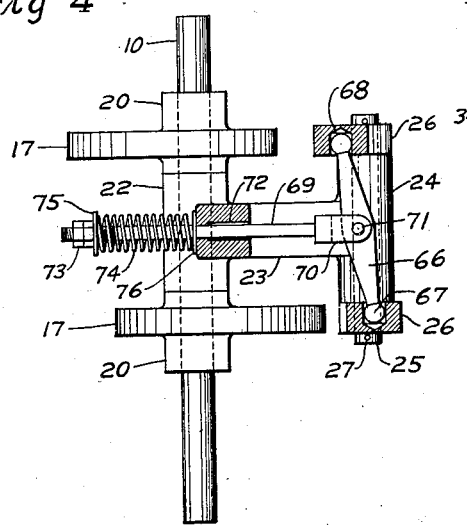
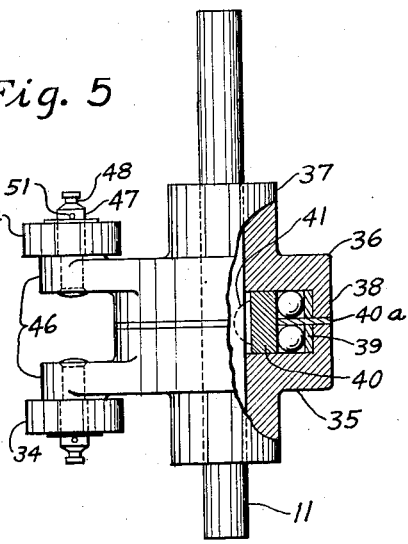
Inventor
HERBERT L. PROUT
Atty. L. A. Paley June 6, 1933.   H. L. PROUT   1,912,917
VARIABLE SPEED TRANSMISSION
Filed Dec. 3, 1932   2 Sheets-Sheet 2

Inventor
HERBERT L. PROUT
Atty. L. A. Paley

Patented June 6, 1933

1,912,917

UNITED STATES PATENT OFFICE

HERBERT L. PROUT, OF VILLA PARK, ILLINOIS

VARIABLE SPEED TRANSMISSION

Application filed December 3, 1932. Serial No. 645,574.

This invention relates to variable speed transmissions in which the speed of a driven or output shaft can be varied relative to that of the driving or input shaft.

In variable speed transmissions, it is desirable that the speed of the output shaft be substantially uniform but adjustably variable from zero up to a desired maximum, or from a low speed up to a considerably higher speed. It is also generally desirable that the maximum speed of the output shaft should be considerably less than the input speed. The mechanism should also be of simple construction with few moving parts, so as to reduce the wear and replacement costs and increase the power transmitting efficiency.

An object of this invention therefore, is to provide a variable speed transmission in which the output shaft rotates with a substantially uniform speed which is variable at will, but at all times less than the speed of the input shaft.

Another object of the invention is to provide a variable speed transmission which is as simple and rugged as possible; also to improve power transmission mechanism in other respects hereinafter specified and claimed.

Reference is to be had to the accompanying drawings, in which

Fig. 1 is a sectional elevation through the variable speed transmission showing the adjustable parts in position to produce zero speed in the output shaft.

Fig. 4 is a sectional view through the mechanism taken on line 4—4 of Fig. 1.

Fig. 5 is a view through the mechanism, partly in section, taken on line 5—5 of Fig. 1, and Fig. 6 is a sectional view through the mechanism taken on line 6—6 of Fig. 1.

Figure 3:
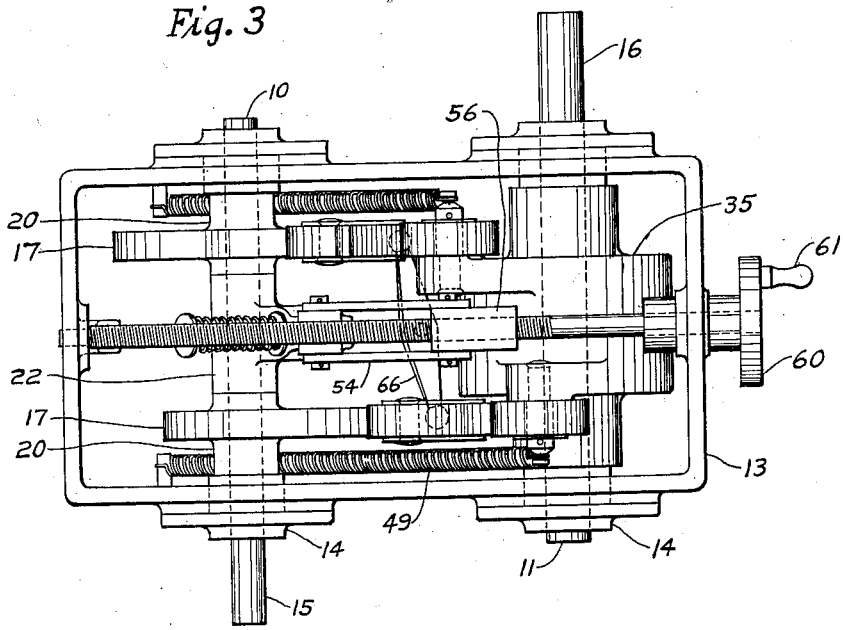
Fig. 3 is a plan view of the transmission mechanism with the case cover removed.
Figure 2:
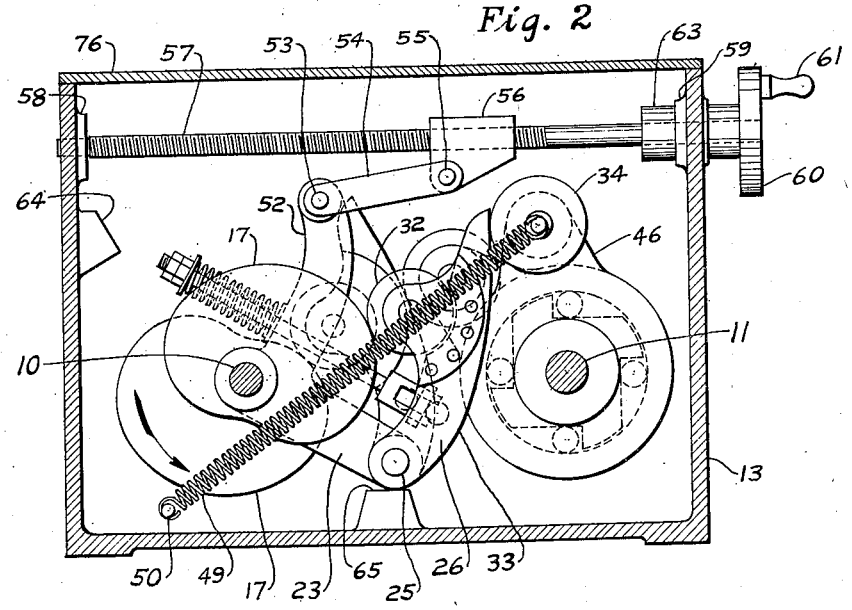
Fig. 2 is a view similar to Fig. 1 but with the adjustable parts in position to produce maximum speed in the output shaft.

The improved variable speed mechanism consists essentially of a driving or input shaft 10 and a driven or output shaft 11 which are rotatably mounted in suitable bearings 14, which are supported in the case or cast metal container 13. The bearings 14 may be plain, or of ball or roller type, and so constructed as to prevent oil in the case 13 from working out past the bearings as the mechanism is operated. The end 15 of the shaft 10 is provided with a sprocket, gear, or other means, not shown, for connecting to a source of power, such as an electric motor. The end 16 of shaft 11 is provided with a sprocket, gear or other means for connecting to a machine to be driven with a variable speed.

A pair of cams 17, preferably of identical shape, are rigidly mounted on shaft 10 in spaced relation, one of said cams being 180° in advance of the other cam. The direction of rotation of the shaft 10 and cam 17 is indicated by the arrow. The rising portions of these cams 17 extend over more than 180° of the periphery, and the falling portions over less than 180° so that the rising, or power stroke, of one cam will continue in action until the rising portion of the other cam comes into position to assume the load, thus imparting a continuous and uninterrupted rotation of the output shaft 11 by a mechanism to be hereinafter described. The cams 17 have hubs 20 which engage the inside of the bearings 14 so as to space the shaft 10 relative to the case walls 13 and prevent axial movement of said shaft. The inside of the hubs 20 are spaced apart so as to leave room for the hub of a bell crank lever 22, which is rotatably mounted for rocking movement on the shaft 10.

One arm 23 of the bell crank lever 22 is provided at its outer end with a laterally extending, elongated hub 24 (Fig. 4) through which passes a pivot pin 25. An oscillating lever or member 26 is pivotally mounted on each end of the pin 25, being restrained from axial movement on the pin 25 by cotter pins 27. Each of the members 26 is provided on one edge with an arcuate recess 28 and plates 29 are secured, one on each side of the lever 26 adjacent the recess 28, as by rivets 30. A pin 31 passes through the plates 29, the ends of pin 31 being provided with upset ends to secure said pin to said plates, (Fig. 6). An idler roller 32 is rotatably mounted on each of the pins 31, each of said rollers engaging the periphery of its corresponding cam 17 so as to cause the members 26 to rock about their pins 25 as the shaft 10 is rotated. A substantially parabolic cam surface 33 is formed on each of the levers 26 and is adapted to engage with an idler clutch roller 34 mounted on a clutch lever 46.

A pair of one way clutches 35 are mounted on the shaft 11 for operating alternately and causing the shaft 11 to rotate at a substantially uniform speed. Each of the clutches 35 comprises a collar 36 having a hub 37 which is rotatably mounted on the shaft 11. An annular flange 38 is formed around the periphery of the collar 36 and is provided with an internal, hardened, steel bushing 39. A clutch spider 40 is rigidly secured to the shaft 11, as by a key 41. A plurality of wedge recesses 42 are formed around the periphery of the spider 40 and a hard metal ball or roller 43 is movably positioned in each of the recesses 42. A spring 44 is seated in each of a plurality of holes 45 formed in the spider 40 adjacent the recesses 42, each of said springs engaging its corresponding ball so as to urge said ball in wedging or clutching engagement between the bushings 39 and the chordal metallic surface of the recess 42 when the flange 38 is rotated in a clockwise direction (Fig. 1) about the shaft 11, but to release from wedging engagement when flange 38 is rotated in a counter clockwise direction. A washer 40a shaped to fit the recesses in spider 40, is provided between the flanges 38 in order to separate the balls 43 in each clutch. A radially extending lever 46 is formed on each of the collars 36 and is provided at the outer end thereof with a pin 47 which rotatably supports one of the rollers 34. An annular groove 48 is formed on the outer end of each of the pins 47 and is adapted to engage the end of a coil spring 49, the other end of said spring engaging a fixed pin 50 which is preferably secured to the wall of the case 13, so as to continuously urge the roller 34 into contact with the cam surface 33. A cotter pin 51 extends diametrically through each of the pins 47 so as to prevent axial movement of the rollers 34 on pins 47.

A lever arm 52 is formed on the bell crank lever 22 and the outer end of said lever 52 is pivotally connected by means of pin 53 to a pair of connecting links 54. The opposite ends of the links 54 are pivotally connected by a pin 55 to a nut or crosshead 56 which is threaded to receive a screw 57, the latter being rotatably supported at its ends in suitable bearings 58 and 59, formed in the walls of the case 13. A handwheel 60 is provided with a handle 61 and is secured to an outstanding end of the screw 57. A collar 63 is secured to the screw 57 inside the bearing 59 so as to prevent axial movement of said screw as it is rotated.

Stop shoulders 64 and 65 are formed inside the case 13 so as to limit the rocking movement of the lever 22 as the screw 57 is rotated. Any other suitable means for adjusting the position of the oscillating members may be used, such as a lever.

In order to resiliently urge the rollers 32 into contact with the periphery of the cams 17, a lever 66 (Fig. 4) is formed with ball ends 67, each of said balls engaging within a hole or socket 68 formed in the inside surface of each of the levers 26. A spring rod 69 is provided with a bifurcated end 70 which is pivotally connected by a pin 71 to the center of the lever 66. The rod 69 passes loosely through a hole 72 in the lever arm 52 and is threaded at its outer end to receive a pair of nuts 73 for regulating the spring tension. A coil spring 74 is supported on the rod 69 between a shouldered washer 75 adjacent the nuts 73, and a shouldered washer 76 adjacent the lever arm 52. A suitable cover 76 is provided for the case 13 to keep dust away from the mechanism and prevent loss of oil by splashing.

In operation, the rotation of the input shaft 10 in a counter clockwise direction causes the rotation of the pair of cams 17 which engage rollers 32 to rock the levers 26 in alternation. Lever 66 between the levers 26 permit said levers 26 to rock in alternation while the spring 74 constantly urges the rollers 32 into engagement with the cams 17. The cam surfaces 33 on levers 26 engage the rollers 34 on clutch levers 46 so as to rock said levers 46 through a varying arc depending on the position of the pivot pin 25 in its arcuate path around the shaft 10. The screw 57 is rotated by handle 61 and acts through crosshead 56, links 54 and lever arm 52 to adjust the position of pivot pin 25 and thus regulate the speed of rotation of the driven shaft 11. The alternate rocking of levers 46 causes the balls 43 of each of the clutches 35 to alternately wedge between the hardened bushings 39 and the spider 40, and thus cause the continuous rotation of the shaft 11 in a clockwise direction. In order to insure the rotation of shaft 11 at a uniform speed without pulsations, the surfaces of the cams 17 and the cam surface 33 are carefully designed with a shape substantially as shown in the drawings so as to attain this end. The speed of the output shaft 11 may be varied from zero up to approximately one-fifth the speed of the input shaft 10. Thus the mechanism also acts as a speed reducer, when interposed between a high speed prime mover, such as an electric motor, and a slow speed piece of machinery which it is desired to drive with a variable speed.

I would state in conclusion, that while the illustrated example constitutes a practical embodiment of my invention, I do not wish to limit myself precisely to these details, since manifestly the same may be considerably varied without departing from the spirit of the invention as defined in the appended claims.

Having thus described my invention, I claim as new and desire to secure by Letters Patent:—

1. In a variable speed transmission, an input shaft and an output shaft, a plurality of cams secured to said input shaft, a pivotally mounted oscillating member positioned adjacent each cam, a roller rotatably mounted on each member and engaging a cam, a cam surface on said oscillating member, means operatively connected with said oscillating member for translating the pivot point of said oscillating member in an arcuate path about said input shaft, and one way clutch means associated with said output shaft for engaging the cam surfaces of said oscillating members and causing a substantially uniform rotation of said output shaft.

2. In a variable speed transmission, an input shaft and an output shaft, a pair of cams secured to said input shaft, a pivotally mounted oscillating lever associated with each of said cams, each of said levers rotatably supporting an idler roller contacting with the periphery of its corresponding cam, a connecting bar connecting said levers with a universal joint, a single spring means associated with said bar for urging said rollers into contact with said cams, and clutch means on said output shaft for engaging said levers and causing the substantially uniform rotation of said output shaft as said levers are oscillated.

3. In a variable speed transmission, an input shaft and an output shaft, a plurality of cams secured to said input shaft, a plurality of one way clutches on said output shaft, each clutch rotatably supporting an idler roller, an oscillating member intermediate a cam and its corresponding clutch roller, said oscillating member having a cam surface for engaging said clutch roller, each oscillating member rotatably supporting an idler roller which contacts with the periphery of a cam, and screw means for bodily translating said oscillating members into a plurality of adjusted positions about the axis of said input shaft as a pivot so as to vary the speed of rotation of said output shaft.

4. In a variable speed transmission, an input shaft and an output shaft, a pair of cams secured to said input shaft in spaced relation, a bell-crank lever mounted on said input shaft between said cams for rocking movement, an adjusting screw engaging a nut, linkage between said nut and one arm of said bell-crank lever, a second arm of said lever having an elongated, transversely extending hub on the end thereof, a pair of oscillating members having cam surfaces, said members being pivotally mounted on said hub and having idler rollers engaging the peripheries of said cams, said screw being adapted for translating said bell-crank lever in an arcuate path about said input shaft, and a pair of one way clutches on said output shaft engaging said oscillating members and causing the rotation of said output shaft with a substantially continuous rotation which is adjusted by positioning said nut by means of said screw.

5. In a variable speed transmission, an input shaft and an output shaft, a pair of cams secured to said input shaft in spaced relation, a bell-crank lever mounted on said input shaft between said cams for rocking movement about said input shaft, adjusting means operatively connected to said lever for moving said lever about said input shaft, an arm on said lever having an elongated, transversely extending hub on the end thereof, a pair of oscillating members having cam surfaces pivotally mounted on said elongated arm and having idler rollers engaging the peripheries of said cams, a spring associated with bell-crank lever urging said rollers against said cams, and a pair of one way clutches on said output shaft, each clutch having an outstanding rock lever rotatably supporting a roller, engaging said cam surface formed on the corresponding oscillating member.

HERBERT L. PROUT.